(12) United States Patent
Andueza

(10) Patent No.: US 10,808,787 B2
(45) Date of Patent: Oct. 20, 2020

(54) SPRING SYSTEM FOR HIGH WORKLOADS

(71) Applicant: FMC TECHNOLOGIES DO BRASIL LTDA, Rio de Janeiro (BR)

(72) Inventor: Alejandro Andueza, Rio de Janeiro (BR)

(73) Assignee: FMC TECHNOLOGIES DO BRASIL LTDA, Rio de Janeiro (BR)

( * ) Notice: Subject to any disclaimer, the term of this patent is extended or adjusted under 35 U.S.C. 154(b) by 24 days.

(21) Appl. No.: 16/061,832

(22) PCT Filed: Dec. 14, 2015

(86) PCT No.: PCT/BR2015/050255
§ 371 (c)(1),
(2) Date: Jun. 13, 2018

(87) PCT Pub. No.: WO2017/100872
PCT Pub. Date: Jun. 22, 2017

(65) Prior Publication Data
US 2018/0363722 A1 Dec. 20, 2018

(51) Int. Cl.
*F16F 3/08* (2006.01)
*F16F 3/087* (2006.01)
*F16F 1/366* (2006.01)
*E21B 17/10* (2006.01)
*E21B 41/00* (2006.01)

(52) U.S. Cl.
CPC ............ *F16F 3/0876* (2013.01); *F16F 1/366* (2013.01); *E21B 17/1028* (2013.01); *E21B 41/0007* (2013.01)

(58) Field of Classification Search
CPC ... E05Y 2201/476; F16F 3/0876; F16F 1/366; E21B 17/1028; E21B 41/0007

USPC .......................... 267/161, 162, 150, 164, 158
See application file for complete search history.

(56) References Cited

U.S. PATENT DOCUMENTS 2,162,719 A * 6/1939 Hay .......................... F16F 1/32
267/162
2,432,717 A * 12/1947 Berger ...................... F16F 1/32
267/162
2,534,123 A * 12/1950 Hasselhorn ........... B21C 37/205
148/529

(Continued)

FOREIGN PATENT DOCUMENTS

DE    37 16 680 A1    12/1988
JP    S62237129 A    10/1987

(Continued)

OTHER PUBLICATIONS

International Search Report issued in PCT/BR2015/050255 dated Sep. 13, 2016 (2 pages).

(Continued)

*Primary Examiner* — Melanie Torres Williams
(74) *Attorney, Agent, or Firm* — Osha Liang LLP

(57) ABSTRACT

Spring systems for subsea applications and equipment projects for the oil and gas industry are preferably manufactured from composite materials and include at least one pair of springs consisting of a first spring component and a second spring component, mounted so as to offer a first central contact region and double curvature and rebound areas forming a coupling. The pair of springs are thus, self-centering.

12 Claims, 3 Drawing Sheets

(56) References Cited

U.S. PATENT DOCUMENTS

| | | | | |
|---|---|---|---|---|
| 2,939,663 A | * | 6/1960 | Suozzo | F16F 1/32 |
| | | | | 248/543 |
| 3,759,351 A | * | 9/1973 | Purple | B60R 19/34 |
| | | | | 188/377 |
| 5,072,917 A | * | 12/1991 | Pleva | F16C 25/083 |
| | | | | 267/161 |
| 5,390,903 A | | 2/1995 | Fidziukiewicz | |
| 7,056,589 B2 | * | 6/2006 | Haupert | B32B 27/18 |
| | | | | 428/297.4 |
| 7,134,648 B1 | * | 11/2006 | Rode | F16F 1/32 |
| | | | | 267/162 |
| 2003/0222385 A1 | * | 12/2003 | Cai | F16F 1/328 |
| | | | | 267/162 |
| 2010/0268243 A1 | * | 10/2010 | Parker | A61F 2/95 |
| | | | | 606/108 |
| 2011/0037210 A1 | * | 2/2011 | Rode | F16F 1/32 |
| | | | | 267/162 |

FOREIGN PATENT DOCUMENTS

| | | |
|---|---|---|
| JP | H1054432 A | 2/1998 |
| WO | 02/26486 A2 | 4/2002 |

OTHER PUBLICATIONS

Written Opinion of the International Searching Authority issued in PCT/BR2015/050255 dated Sep. 13, 2016 (5 pages).

* cited by examiner

SPRING SYSTEM FOR HIGH WORKLOADS

FIELD OF THE INVENTION

The present invention relates to spring systems to be used in subsea applications and in equipment projects for the oil and gas industry. More specifically, the present invention relates to spring systems having assembly topology similar to that used in Belleville-type springs. Preferably, the springs according to the present invention are manufactured with composite materials, metallic materials or any other material that might be developed and, thus, may be applied in said springs.

BACKGROUND OF THE INVENTION

As is well known to persons skilled in the art, helical springs manufactured with metallic materials are widely used in mechanical equipment. In the oil and gas industry, they are often used in subsea hydraulic actuators, but require their immersion in oil in order to ensure corrosion resistance in marine environments. The application of these helical springs further requires the use of a pressure compensation system to provide their adequate operation.

Belleville springs, also known as Belleville gaskets, disk springs, conical springs or Belleville washers have been disclosed by J. F. Belleville in 1867 and, in that time, constituted another type of spring having non-linear ratio between workload and strain.

One property of this class of springs is the high capacity to store elastic potential energy with little deflection, thus allowing its application in projects requiring reduced dimensions, and can also be used with different configurations, in series, parallel or in a double arrangement. These springs are also used to maintain high tension in bolted applications, such as switches, compensating different expansion rates in joints while maintaining the required pressure. Examples of applications can be found in all fields of mechanical engineering, from subsea hydraulic actuators, intended application by the present invention, clutches and damping systems, to shoe shock absorbers.

The Belleville-type spring has a conical shape, usually being manufactured from metallic materials. In the oil and gas industry, it is mainly used in subsea hydraulic actuators, in cases that demand a high level of elastic potential energy storage. However, these springs show some disadvantages, such as weight, such factor becoming increasingly important in a project execution efficiency, corrosion susceptibility and embrittlement induced by hydrogen produced by the cathodic protection. One solution is to maintain them immersed in oil solution and isolated from marine environment, as occurs with helical springs; however, such systems require pressure compensation to allow movement of the spring. Other issues are related to sealing and contamination systems, when stored for long periods of time. Such solutions increases the size of the equipment and, thus, production and transportation costs.

Notwithstanding, Belleville-type springs have great flexibility for projects and can be mounted in serial sets to increase the permissible travel, as well as in parallel sets to increase elastic potential energy storage capacity for a same strain value. Belleville-type springs are also referred to as plate springs, in view of their generally circular shape. In the same way as helical springs, they also have the disadvantage of being subject to corrosion and embrittlement induced by hydrogen produced by the cathodic protection. Several patent documents disclose assemblies of this spring type, some of which are cited below as an example.

Document JPH1054432(A) discloses an arrangement of Belleville springs developed to solve problems related to relative lateral motion between springs that make up the arrangement. With this in view, said arrangement provides for disks provided with protrusions and grooves in opposite symmetrical sides, as can be observed in FIG. 4 of the document, in order to provide the proper assembly and mounting of elements to each other. This arrangement, however, requires two rebounds to self-center the springs, which represents a difficulty in the manufacturing and assembly of the arrangement.

Document JPS62237129A also illustrates a type of assembly of these springs, but requires the presence of sleeves on springs, which are filled with a curved wire, through which the force is transmitted.

Document US2011037210(A1) describes conical shaped disk springs. These springs have an assembly feature in which a plurality of disks may be assembled in series or parallel, being axially aligned. However, the assembly of one row of these springs necessarily requires an auxiliary element which has the function to centralize said springs in the serial configuration, such that the axial alignment thereof may be achieved.

Thus, it is the main object of the present invention to provide a spring system for high workloads which can advantageously solve deficiencies of those existing in the prior art, notably in subsea applications, by the fact that said springs have cylindrical geometry which enables their self-centering in any assembly position, without the need of any additional element, regardless of the type of assembly.

With this goal, the springs according to the present invention have a geometry that is completely different and more adequate for the production and functioning with composite materials.

In a general manner, a spring system for high workloads according to the present invention will comprise one self-centering pair of springs, a first spring being cylindrical and a second spring being cylindrical with double curvature, so as to allow a self-centered system in any and all mounting positions.

BRIEF DESCRIPTION OF THE INVENTION

According to the present invention, a Belleville-type spring system is provided, mounted in series, parallel or any combination thereof. Said springs being manufactured preferably from composite materials, which make up self-centering mechanisms and are adequately applied for operation with high workloads.

As will be appreciated, the spring system according to the present invention, and configured by at least one pair of components, comprises in its contact region double curvature and rebound regions, this being the feature responsible for the self-centering of the assembly. The assembly topology can be one similar to those of Belleville springs, however, differing from those by their geometry, in view that while one spring component has a predominantly cylindrical shape, the second spring component has a partially cylindrical shape.

Thus, it is observed that the spring system according to the present invention comprises one self-centering pair, a first spring being cylindrical and a second spring being cylindrical with double curvature to allow for self-centering in all mounting positions.

BRIEF DESCRIPTION OF DRAWINGS

The spring system for high workloads according to the present invention shall be well understood from the illustrative appended figures, which, in a schematic way and not limiting the scope, represent.

DETAILED DESCRIPTION OF THE INVENTION

Figure 1:
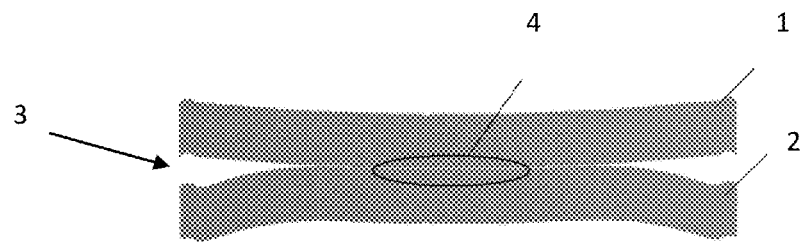
FIG. 1—front view of one pair of components of the spring system according to the present invention.

In one first aspect, according to FIG. 1, the present invention provides a spring system for high workloads which comprises at least one pair of springs (3) formed by a first spring component (1) and a second spring component (2). Said first spring component (1) and second spring component (2) have topology similar to that of Belleville springs, however, these differing due to their geometry.

The spring component (1) has a predominantly cylindrical geometry, while spring component (2) has a partially cylindrical geometry. Thus, it can be verified that one can obtain a first central contact region (4) between said first spring component (1) and second spring component (2) which allow the self-centering of components (1) and (2).

Figure 2:
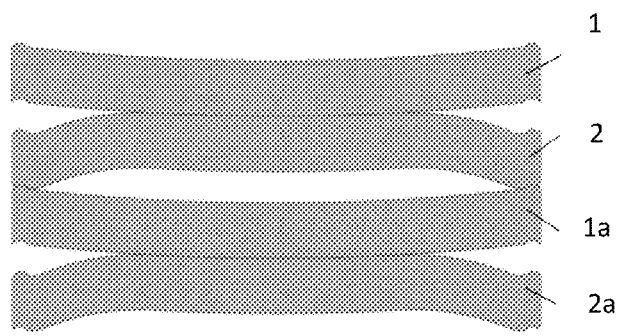
FIG. 2—front view of a spring system according to the present invention assembled in series.
Figure 4:
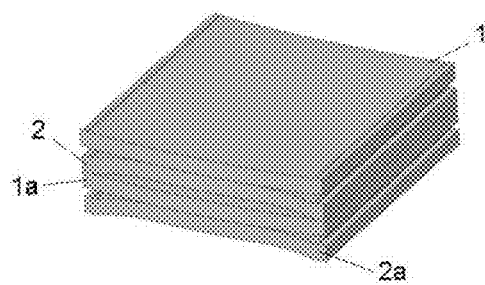
FIG. 4—perspective view of the spring system illustrated in the assembly of FIG. 2.

The spring system according to the present invention can be mounted, for example, as illustrated in FIGS. 2 and 4, in a series configuration. In this series assembly system, one has two pairs of springs (3), such that one first pair of springs comprises one first spring component (1) and one second spring component (2), said first pair of springs being assembled in a contiguous manner, i.e., in series, with one second pair of springs comprising one first spring component (1a) and one second spring component (2a).

Figure 5:
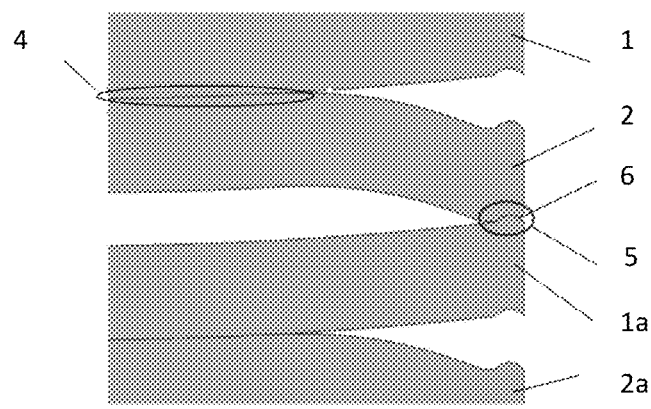
FIG. 5—Magnified detail of the self-centering feature of the components of the spring system illustrated in FIG. 2.

As illustrated in a magnified detail in FIG. 5, in this condition, in addition to obtaining one first central contact region (4), between said first spring component (1) and second spring component (2), one also obtains a second contact region (5) through double curvature and rebound areas, so that the assembly may provide self-centering features, thus blocking transverse relative movements between said second spring component (2) and the subsequent first spring component (1a) through a coupling.

Figure 3:
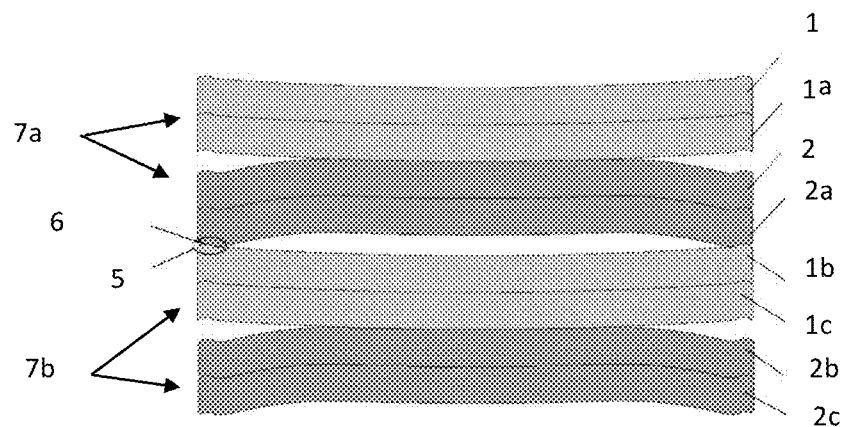
FIG. 3—front view of a spring system according to the present invention assembled in parallel.

The spring system according to the present invention can be mounted, for example, as illustrated in FIG. 3, in a parallel configuration. In this parallel mounting system, there is one first set of spring components (1, 1a) mounted in parallel, which forms one first pair of springs (7a) with one second set of spring components (2, 2a), also mounted in parallel. As can be seen, said first pair of springs (7a) can thus be mounted in a first series configuration with one second pair of springs (7b), providing with the latter the same contact region features (5) through double curvature and rebound areas, so that the set may achieve the self-centering feature, thus blocking transverse relative movements between said first pair of springs (7a) and second pair of springs (7b) through a coupling (6).

The parallel mounting system according to above-described FIG. 3 is especially adequate for being used to increase the maximum force of the spring system according to the present invention to a same strain.

Figure 6:
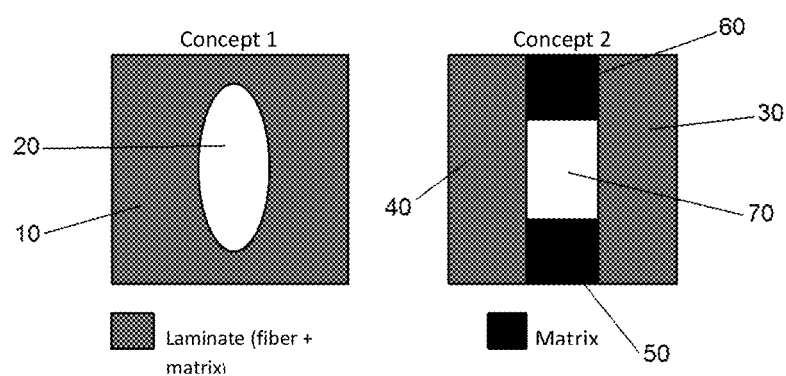
FIG. 6—Concept base for manufacturing one component of the spring system according to the present invention.

In a second aspect, the present invention provides two concepts of manufacturing of the above-described high workload springs as illustrated in FIG. 6. In concept 1, the composite laminate (10) is manufactured by any known process, but must be such that it provides the carrying out of a central orifice (20) for the passage of the stem in a hydraulic actuator. In concept 2, said spring must be manufactured from two laminates (30, 40) joined by a matrix (50, 60) so as to provide an orifice (70) for the passage of the stem in a hydraulic actuator.

The spring of the spring system according to the present invention may be manufactured using a number of manufacturing methodologies. The composite material with PEEK matrix and carbon fiber is preferred, but is not limited thereto, when the use of the spring system is directed at subsea environments. Thus, other materials may be used, including metallic materials.

The use of composite materials in the manufacturing of the springs that make up the spring system according to the present invention has the advantage of eliminating all issues of corrosion and compatibility with hydrogen released by the cathodic protection systems in subsea environments. Negating the need to maintain a pressure compensation reservoir is yet another great advantage of using composite materials for said springs used in subsea environment.

In addition, the use of the spring system according to the present invention in subsea actuators shall allow for reducing the costs of equipment projects with the reduction in the size of subsea Christmas tree blocks, in addition to a subsequent increase in the reliability of systems with its simplification.

The spring system object of the present invention has been conceived in view of the use in subsea equipment, for storing elastic potential energy for actuating subsea valves through hydraulic actuators. Notwithstanding, this application is not unique, considering that the spring system according to the present invention can be used for storing energy in any type of subsea equipment, or even on the surface, in the oil and gas industry, as well as in other mechanical engineering general application fields.

Persons skilled in the art shall further appreciate that the spring geometry which makes up the spring system of the present invention confers an important feature related to the fact that the same is self-centering, this being an added advantage in relation to Belleville-type springs in the prior art, which do not have this feature.

The invention claimed is:

1. A spring system for high workloads comprising:
at least one pair of Belleville springs comprising:
one first spring component and one second spring component, the second spring component having a geometry different than a geometry of the first spring component, said first spring component having a predominantly cylindrical geometry and said second spring component having a partially cylindrical geometry, and
said pair of springs has one first central contact region between said first spring component and second spring component, and wherein the first spring component has a double curvature and the second spring component has a corresponding rebound forming a coupling, said pair of springs being thus self-centering.

2. The spring system for high workloads according to claim 1 further comprising more than one pair of springs mounted in series or in parallel.

3. The spring system for high workloads according to claim 2, wherein the spring system comprises a series assembly consisting of at least two pairs of springs, such that one first pair of springs comprises one first spring component and one second spring component, said first pair of springs being assembled in a contiguous manner with one second pair of springs comprising one first spring component and one second spring component.

4. The spring system for high workloads according to claim 3, wherein the series assembly includes a first central contact region of the second pair of springs between said first spring component and second spring component of the second pair of springs and one second contact region provided by a double curvature of a spring of the first pair of springs and a rebound of the second pair of springs, forming a coupling.

5. The spring system for high workloads according to claim 3, comprising a parallel mounting comprising of one first set of spring components mounted in parallel, which forms one first pair of springs with one second set of spring components, also mounted in parallel.

6. The spring system for high workloads according to claim 5, comprising one first pair of springs and one second pair of springs, mounted in series so as to provide a contact region through double curvature and rebound areas, forming the self-centering coupling of the system.

7. The spring system for high workloads according to claim 1, wherein said springs are made of composite materials, so that one laminate is provided with a central orifice for the passage of the stem of a hydraulic actuator.

8. The spring system for high workloads according to claim 1, wherein said springs are made of composite materials, so that two laminates are joined by a matrix so as to provide an orifice for the passage of the stem of a hydraulic actuator.

9. The spring system for high workloads according to claim 1, wherein the spring system is used to increase maximum strength for a same strain.

10. The spring system for high workloads, according to claim 1, wherein the spring system is manufactured with a PEEK matrix and carbon fiber for subsea environment applications.

11. The spring system for high workloads, according to claim 1, wherein the spring system is used in subsea equipment for the storage of elastic potential energy for the actuation of subsea valves through hydraulic actuators.

12. A spring system for high workloads comprising:
a first pair of Belleville springs comprising:
one first spring component and one second spring component, each component having a rectangular geometry, and
said pair of springs having one first central contact region between said first spring component and second spring component, and wherein the first spring component has a double curvature and the second spring component has a corresponding rebound forming a coupling, said pair of springs being thus self-centering;
a second pair of Belleville springs positioned in series with the first pair of Belleville springs, the second pair of Belleville springs comprising:
one first spring component and one second spring component, each component having a rectangular geometry,
wherein the second spring component of the first pair of Belleville springs comprises a double curvature and the first spring of the second pair of Belleville springs comprises a corresponding rebound in contact with the double curvature of the second spring component of the first pair of Belleville springs forming a coupling, the pairs of springs being thus self-centering.

* * * * *